United States Patent [19]

Stevens

[11] 4,132,378
[45] Jan. 2, 1979

[54] CONTROL SYSTEM FOR AIRCRAFT

[75] Inventor: Curtis E. Stevens, Irvine, Calif.

[73] Assignee: Bertea Corporation, Irvine, Calif.

[21] Appl. No.: 521,275

[22] Filed: Nov. 6, 1974

[51] Int. Cl.² ............................................. G05D 1/00
[52] U.S. Cl. ................................... 244/175; 290/40 R
[58] Field of Search ................. 60/DIG. 2; 91/363 R, 91/363 A, 171; 235/150.2, 150.22; 244/77, 78, 83 E, 175, 194; 250/208, 227, 199; 290/30 R, 52, 40 R; 318/640; 324/96; 364/424

[56] References Cited

U.S. PATENT DOCUMENTS

| | | | |
|---|---|---|---|
| 2,199,319 | 4/1940 | Lansing | 290/52 |
| 2,788,476 | 4/1957 | Shaw | 244/77 R X |
| 2,953,691 | 9/1960 | Rapp | 290/40 R X |
| 2,974,235 | 3/1961 | Guth et al. | 290/40 R |
| 3,386,689 | 6/1968 | Parker et al. | 244/77 F |
| 3,438,306 | 4/1969 | Kazmarek | 244/78 X |
| 3,549,109 | 12/1970 | Gilstrap | 244/77 F |
| 3,612,882 | 10/1971 | Sheppard | 250/208 |
| 3,652,835 | 3/1972 | Devlin et al. | 235/150.22 |

*Primary Examiner*—Stephen G. Kunin
*Attorney, Agent, or Firm*—Gordon L. Peterson

[57] ABSTRACT

A control system for generating a control signal at a first station, transmitting the control signal to a second station, and processing the control signal at the second station to provide a controlled output. At least some of the processing equipment at the second station draws electrical power, and power for such purposes is generated by a generator located at the second station.

11 Claims, 2 Drawing Figures

CONTROL SYSTEM FOR AIRCRAFT

BACKGROUND OF THE INVENTION

A primary function of an aircraft control system is to control the position of the aircraft control surfaces in response to pilot, autopilot, or other appropriate input commands. In one conventional system the input command is converted to an electrical control signal which is transmitted along conductors in the form of long wires to a remote station adjacent the control surface, the position of which is to be controlled. At the remote station, the electrical control signal is processed and used to control a hydraulic actuator which controls the position of the control surface. The processing of the electrical control signal is carried out by equipment which uses electrical power. This electrical power is also conducted to the remote station from a central generating station over long conductive wires.

The long conductive wires extending from a central location to the several remote stations of the aircraft cause a safety problem. Specifically, aircraft are subject to being struck by lightning, and when this occurs the presence of the long conductors increases the likelihood that the entire electric system will be rendered inoperative. The wires can be made relatively safe with shielding and other protective devices; however, this degrades performance and adds to the cost and weight of the control system.

SUMMARY OF THE INVENTION

The present invention provides a control system which does not require conductive wires between a central station and the remote stations of the aircraft. Although the present invention is adapted for use in aircraft, it may be used in other systems.

To permit elimination of the conductive wires which have been used heretofore for transmitting control signals, the present invention uses a control signal which is adapted for wireless transmission, i.e., a wireless control signal. For example, optical, radio, sound, pneumatic, and hydraulic signals may be utilized as the wireless control signal. However, sound, pneumatic, and hydraulic signals are generally inappropriate for aircraft use. An optical control signal can be transmitted by a fiberoptics cable or be in the form of a beam, such as a laser beam.

However, using a control signal adapted for wireless transmission is alone insufficient to eliminate all of the conductive wires leading to the remote stations because the control equipment at each of the remote stations characteristically requires electrical power to operate. For example, the processing equipment at the remote station might include an amplifier and other electrical power utilizing components.

To eliminate the conductive wires used for transmitting electric power to each remote station, the present invention provides an electric generator at each remote station. The electric generator provides sufficient electrical power to meet the power requirements of the equipment at the remote station.

Another advantage of electrical power generation at the remote system is that the kind of power generated can be tailored to the needs of the electrical power utilizing equipment at that station. Also, with the power generating function divided, no single generator failure would result in total loss of power to the aircraft.

Of course, the electric generator is itself a user of power. However, hydraulic power is characteristically available at each remote station of the aircraft for use in positioning the control surface or performing other work. Similarly, many other nonaircraft systems utilize hydraulic power at remote stations to provide a controlled output. The present invention makes use of this hydraulic power by providing a motor which derives power from the hydraulic power. The motor is used to drive the generator. The motor may be of any type which directly, or indirectly, derives its power hydraulically. For example, the motor may be a hydraulic motor or a turbine. The hydraulic motor can be integral with the electricl generator or a completely separate unit.

The control system provides a controlled output at the remote station. This output can be in various different forms such as mechanical, hydraulic, electrical, etc. The use of a controlled mechanical output to control the position of an aircraft control surface is merely illustrative.

The control unit at the remote station may include two or more components, each of which utilizes electric power having a different characteristic. For example, certain of the components may require AC and other of the components may require DC, and the components may require different voltage levels to provide each of these characteristics. The present invention provides a power conditioner which appropriately processes the power from the generator.

The invention can best be understood by reference to the following description taken in connection with the accompanying illustrative drawing.

DESCRIPTION OF THE PREFERRED EMBODIMENTS

Figure 1:
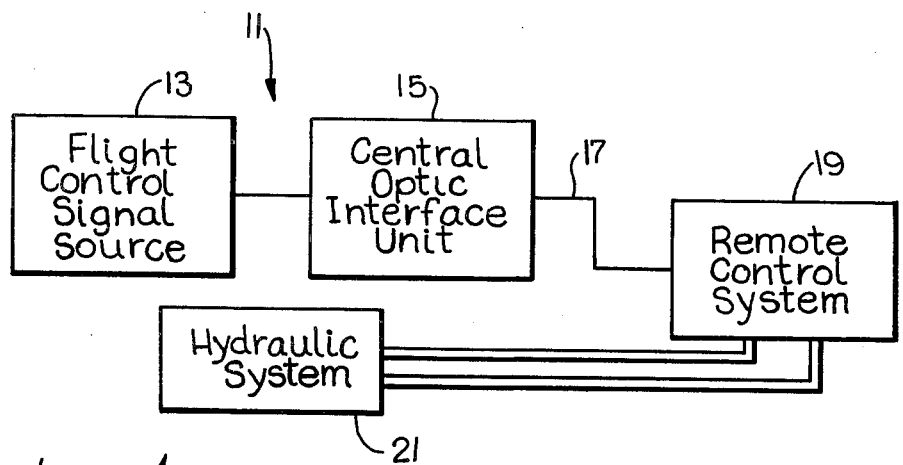
FIG. 1 is a schematic view of a control system constructed in accordance with the teachings of this invention.

FIG. 1 shows a control system 11 constructed in accordance with the teachings of this invention. Although the control system 11 is particularly adapted for use in aircraft, it is readily adaptable to other applications such as production equipment and submarines. The control system 11 is particularly adapted for use in hazardous areas where electrically conductive wires should not be run from a central station to a remote station.

The control system 11 includes a flight control signal source 13 which may be any device for generating a control signal. For example, the flight control signal source 13 may include a flight computer, an autopilot, the pilot's stick, or a combination of these. In the embodiment illustrated, the flight control signal source 13 provides a control signal which is in the form of a pulse width modulated digital electrical signal; however, the control signal could be of other types.

The control signal is transmitted to a central optic interface unit 15, which along with the flight control signal source 13, are located at a central station. For aircraft applications the central station may be in the vicinity of the cockpit. The central optic interface unit 15 converts the electrical digital control signal to an optical digital control signal and applies the same to a fiber optics cable 17. The control system 11 is a single channel control system, and accordingly the central optic interface unit 15 may be quite simple. For example, the central optic interface unit 15 may include a light emitting diode which is pulsed by the electrical digital control signal to provide the optical digital control signal. The present invention is also applicable to multichannel control systems, and such systems would have to include the necessary equipment for multiplexing.

Wireless transmission means in the form of a fiber optics cable 17 extends from the central optic interface unit 15 at the central station to a remorte control system 19 which is located at a remote station. The central station and the remote station may be widely spaced, and thus, the fiber optics cable 17 may extend for a substantial distance. Other forms of wireless control signals adapted for wireless transmission such as radio signals, sound, pneumatic, and hydraulic signals and a laser beam can be utilized, if desired, in lieu of the optical digital control signal. Of course, the wireless transmission means must be selected so as to be compatible with the wireless control signal being used.

The remote control system 19 is coupled to a hydraulic system 21 which is not located at the remote station. However, the remote control system 19 does not have any electrical leads or wires extending therefrom.

Figure 2:
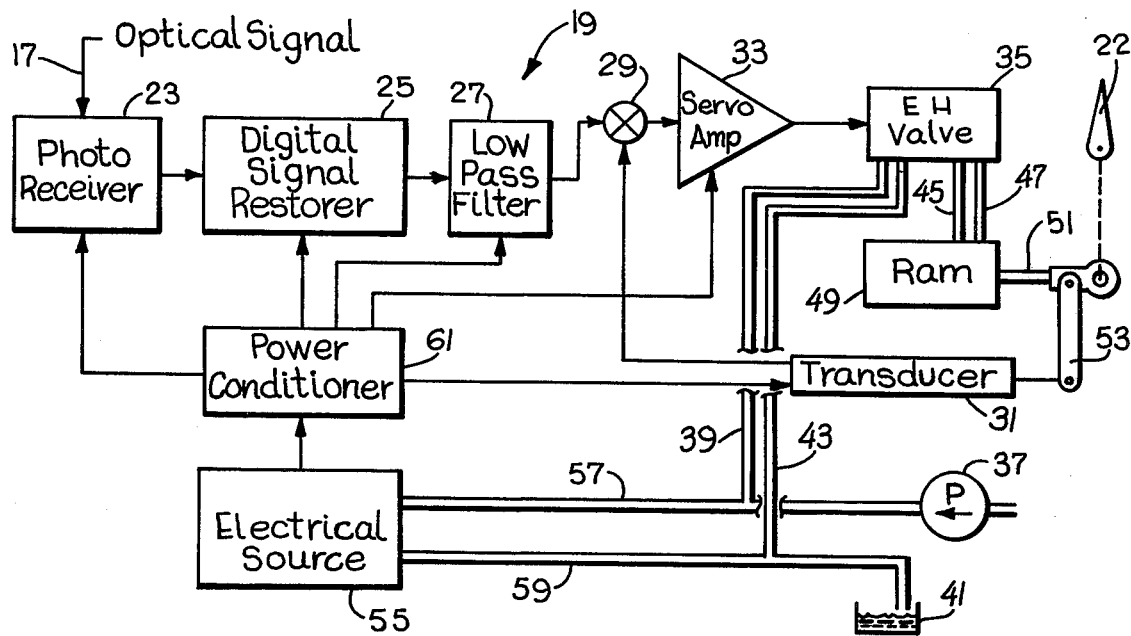
FIG. 2 is a schematic view of one form of remote control system constructed in accordance with the teachings of this invention with the remote control system being coupled to a hydraulic system.

FIG. 2 shows one particular form of remote control system or control unit 19 which is located near a control surface 22 of an aircraft. The remote control system 19 includes a photo receiver 23, which receives the digital optical control signal from the fiber optics cable 17 and converts such signal to an electrical digital signal. To carry out this function, the photo receiver 23 may include, for example, a silicon photodiode.

The electrical digital signal from the photo receiver 23 is applied to a digital signal restorer 25 which shapes the electrical digital signal. Any conventional wave shaping equipment may be employed for the digital signal restorer 25.

The shaped digital electrical signal is then demodulated by a low pass filter 27, and the resulting demodulated analog signal is transmitted to a summing point 29 where this signal is summed with another analog signal from a position transducer 31. The summed signal is amplified by a servo amplifier 33, and the amplified signal or processed electrical control signal is applied to the coils of an electrohydraulic valve 35. The electrohydraulic valve 35 may be of conventional design, and it provides a hydraulic output which is proportional to the electrical input. To this end, the hydraulic system 21 includes a pump 37 for supplying hydraulic oil through a conduit 39 to the valve 35 and a return sump 41 for receiving hydraulic fluid from the valve 35 via a conduit 43. The valve 35 controls the flow of hydraulic fluid through conduits 45 and 47 to a ram or actuator 49 in a well-known manner. The ram 49 may include a conventional piston and cylinder arrangement with the piston being movable to control the position of a rod 51. The rod 51 provides a controlled mechanical output, and the position of the rod 51 varies in accordance with the control signal provided by the flight control signal source 13. Thus, the photo receiver 23, the restorer 25, the filter 27, the amplifier 33, the valve 35, and the ram 49 serve as processing means for processing the control signal received by the receiver 23 for providing a controlled output. The rod 51 may be used to drive or position any member such as the flight control surface 22. If desired, an intermediate hydraulic stage may be employed between the valve 35 and the ram 49.

The transducer 31 is coupled to the rod 51 by a link 53. In this manner, the transducer 31 provides an analog position feedback signal to the summing point 29 with such signal being a function of the position of the rod 51.

Several of the components of the remote control system 19 utilize electrical power. That power is generated at the remote station by an electrical source 55. The electrical source 55 is coupled to the pump 37 and the sump 41 by conduits 57 and 59, respectively. The electrical source 55 may include any components which will utilize hydraulic power to generate electrical power. For example, the electrical source 55 may include a hydraulic motor, or various kinds of turbines for converting the hydraulic power from the pump 37 to mechanical power. The electrical source 55 may also include an electrical generator driven by this mechanical power. The motor and generator can be integrated into a single package as shown in FIG. 2 or be separate units.

The generator generates alternating current at the desired frequency. The electrical generator can be both small and self contained and for this reason may run at very high rpm, if desired. This permits the generation of higher frequency power with good efficiency. Thus, use of the electrical source 55 permits generation of power tailored specifically to the requirements of the power utilizing components of the remote control system 19.

By way of example, the electrical source 55 may provide 20 volts AC which is supplied to a power conditioner 61. The power conditioner processes the power received from the source 55 so as to make it utilizable by the various power utilizing components of the remote control system 19. By way of example, the photo receiver 23, the low pass filter 27, and the amplifier 33 may each receive ± 15 volts DC, the digital signal restorer 25 may receive + 5 volts DC, and the transducer 31 may receive 20 volts AC. The power conditioner 61 includes an AC to DC converter, and the necessary impedances to appropriately condition the power from the source 55 to provide it with the characteristics to meet the requirements of each piece of power utilizing equipment of the remote control system 19.

Except for the electrical source 55, the power conditioner 61, and the photo receiver 23, the system shown in FIG. 2 is basically a conventional aircraft control system. However, local power generation eliminates the need for running conductive wires to the remote station and this, in turn, has cost, weight and safety advantages. The electrical source 55 can also generate power tailored to the particular requirements of the power utilizing components of the remote control system 19. In addition, with the power generating function divided among numerous remote stations, no single generator failure results in a total electrical power loss to the aircraft.

Although an exemplary embodiment of this invention has been shown and described, many changes, modifications and substitutions may be made by one with ordinary skill in the art without necessarily departing from the spirit and scope of this invention.

I claim:

1. A control system for positioning a control surface of an aircraft comprising:
   means at a first station on the aircraft for providing a wireless control signal;
   wireless transmission means for transmitting the control signal to a second station on the aircraft;
   means at the second station for processing the control signal to provide a processed electrical control signal;
   electrohydraulic valve means at the second station for providing a fluid output related to the processed electrical control signal;
   means responsive to the fluid output of the electrohydraulic valve means for providing a mechanical output, said mechanical output being usable to position the control surface;
   said processing means utilizing electric power;
   a motor at the second station deriving power from hydraulic power;
   an electric generator at the second station driven by the motor for producing electric power; and
   means for transmitting electric power from the electric generator to said processing means.

2. A control system as defined in claim 1 wherein said motor is a hydraulic motor.

3. A control system for positioning a control surface of an aircraft, comprising:
   flight control signal source means at a first station on the aircraft for generating a wireless control signal to influence the flight of the aircraft, said flight control signal source means including a control member operable by a pilot of the aircraft;
   wireless transmission means for transmitting the wireless control signal from the first station to a second station on the aircraft, said second station being adjacent the control surface;
   means for providing hydraulic power at said second station;
   motor means at the second station drivable by the hydraulic power;
   generator means at the second station drivable by the motor means for providing electric power;
   receiver means at the second station for receiving the wireless control signal;
   first means at the second station adapted to utilize electrical power and responsive to the wireless control signal received by the receiver means for providing an electrical control signal;
   means for transmitting electrical power from the generator means to said first means; and
   means at the second station driven by the hydraulic power and responsive to the electrical control signal to position said control surface.

4. A control unit as defined in claim 3 wherein the wireless control signal is an optical control siganl and said receiver means is adapted to receive the optical control signal.

5. A control unit as defined in claim 3 wherein the control signal is an optical control signal and said receiver means is adapted to receive the optical control signal, and power conditioner means for modifying the electric power from the generator means to provide first and second electric power sources each with different characteristics.

6. A control system for an aircraft comprising:
   means at a first station on the aircraft for providing a control signal;
   transmission means for transmitting the control signal to a second station on the aircraft;
   processing means at the second station for processing said control signal to provide a controlled output which is related to said control signal, said processing means utilizing electric and hydraulic power in said processing of said control signal;
   a motor at the second station deriving power from hydraulic power;
   an electric generator at said second station drivable by said motor for generating electric power for use by said processing means; and
   said control signal being of the type which is adapted for wireless transmission by the transmission means and said transmission means includes wireless transmission means for transmitting the control signal to the second station.

7. A control system as defined in claim 6 including power conditioner means for modifying the power from the generator to provide first and second electric power sources each with different characteristics.

8. A control system as defined in claim 6 wherein said processing means includes first and second components adapted to utilize electric power having first and second characteristics, respectively, said first and second characteristics being different, said control system includes power conditioning means at the second station for receiving the electric power from said generating means and providing electric power having said first and second characteristics.

9. A control system for an aircraft comprising:
   means at a first station on the aircraft for providing a control signal;
   transmission means for transmitting the control signal to a second station on the aircraft;
   processing means at the second station for processing said control signal to provide a controlled output which is related to said control signal, said processing means utilizing electric and hydraulic power in said processing of said control signal;
   a motor at the second station deriving power from hydraulic power;
   an electric generator at said second station drivable by said motor for generating electric power for use by said processing means; and
   said control signal being an optical signal and said processing means including first means for converting the optical control signal to an electrical control signal and hydraulically operated means responsive to the electrical control signal to provide said controlled output.

10. A control system as defined in claim 9 wherein said processing means includes amplifier means for amplifying the electrical control signal to provide an amplified control signal, said hydraulically operated means being responsive to the amplified control signal to provide said controlled output, said electric generator providing electric power for said amplifier means.

11. A control system for an aircraft comprising:
    means at a first station on the aircraft for providing a control signal;
    transmission means for transmitting the control signal to a second station on the aircraft;
    processing means at the second station for processing said control signal to provide a controlled output which is related to said control signal, said processing means utilizing electric and hydraulic power in said processing of said control signal;

a motor at the second station deriving power from hydraulic power;

an electric generator at said second station drivable by said motor for generating electric power for use by said processing means; and said control signal being an optical control signal and said transmission means including a fiberoptics cable for transmitting the optical control signal.

* * * * *